United States Patent
Tian et al.

(10) Patent No.: US 8,195,935 B2
(45) Date of Patent: Jun. 5, 2012

(54) SYSTEMS, METHODS AND COMPUTER-ACCESSIBLE MEDIA FOR ACQUIRING AND AUTHENTICATING PUBLIC KEY CERTIFICATE STATUS

(75) Inventors: Haibo Tian, Shaanxi (CN); Jun Cao, Shaanxi (CN); Liaojun Pang, Shaanxi (CN); Manxia Tie, Shaanxi (CN); Zhenhai Huang, Shaanxi (CN); Bianling Zhang, Shaanxi (CN)

(73) Assignee: China Iwncomm Co., Ltd., Shaanxi Province (CN)

( * ) Notice: Subject to any disclaimer, the term of this patent is extended or adjusted under 35 U.S.C. 154(b) by 533 days.

(21) Appl. No.: 12/442,462

(22) PCT Filed: Jul. 16, 2007

(86) PCT No.: PCT/CN2007/070303
§ 371 (c)(1),
(2), (4) Date: Mar. 23, 2009

(87) PCT Pub. No.: WO2008/034361
PCT Pub. Date: Mar. 27, 2008

(65) Prior Publication Data
US 2010/0031031 A1 Feb. 4, 2010

(30) Foreign Application Priority Data

Sep. 23, 2006 (CN) .......................... 2006 1 0104680

(51) Int. Cl.
*H04L 29/06* (2006.01)
(52) U.S. Cl. ...................................................... 713/158
(58) Field of Classification Search .................. 713/155, 713/156, 157, 158, 168, 173, 175, 180, 181; 726/5, 6, 10, 18; 380/278, 282
See application file for complete search history.

(56) References Cited

U.S. PATENT DOCUMENTS
2005/0246766 A1 11/2005 Kirkup

FOREIGN PATENT DOCUMENTS
CN 1426200 A 6/2003
(Continued)

OTHER PUBLICATIONS
International Search Report for International Application No. PCT/CN2007/070303 dated Nov. 1, 2007 with English-language translation.

(Continued)

*Primary Examiner* — Gilberto Barron, Jr.
*Assistant Examiner* — Izunna Okeke
(74) *Attorney, Agent, or Firm* — Dorsey & Whitney LLP

(57) ABSTRACT

Exemplary embodiments of systems, methods and computer-accessible medium can be provided for obtaining and verifying a public key certificate status. In particular, it is possible to construct and send a certificate query request, construct and send a combined certificate query request, construct and send a combined certificate status response, deliver a certificate status response, perform a verification by the general access point, and/or perform a verification by the user equipment. The exemplary embodiments address some of the deficiencies of conventional methods which have a complicated implementation as well as likely inability of such conventional methods to be applied to the network architecture of user equipment, a general access point and a server. The exemplary embodiments of the systems, methods and computer-accessible medium can obtain a user certificate status to provide certificate statuses of the user or the user equipment and the general access point when the user equipment accesses the network via the general access point. Message exchanges can be reduced, bandwidth and calculation resources can be saved, and higher efficiency can be achieved. According to another exemplary embodiment, by way of adding random numbers into the certificate query request and the combined certificate query request, as well as the message m, freshness of the certificate status response can be facilitated and even ensured, and security protection can be enhanced.

20 Claims, 1 Drawing Sheet

FOREIGN PATENT DOCUMENTS

| | | |
|---|---|---|
| CN | 1437375 | 8/2003 |
| CN | 1534931 A | 10/2004 |
| CN | 1668005 | 9/2005 |
| CN | 1668006 A | 9/2005 |
| CN | 1674497 | 9/2005 |
| CN | 1799638 A | 11/2005 |
| EP | 1117206 | 7/2001 |
| EP | 1589695 | 10/2005 |
| EP | 1852999 | 11/2007 |
| WO | WO-02/063847 | 8/2002 |
| WO | WO 2005/039099 | 4/2005 |

OTHER PUBLICATIONS

Yang Yanchun, Analysis of WAPI Security, Computer Engineering, May 2005, vol. 31, No. 10, pp. 135-136, 170.

Chen Guanghui, Journal of UEST of China, Apr. 2005, vol. 34, No. 4, pp. 183-185.

European Search Report mailed Jun. 20, 2011 for European Patent Application No. 07764230.4.

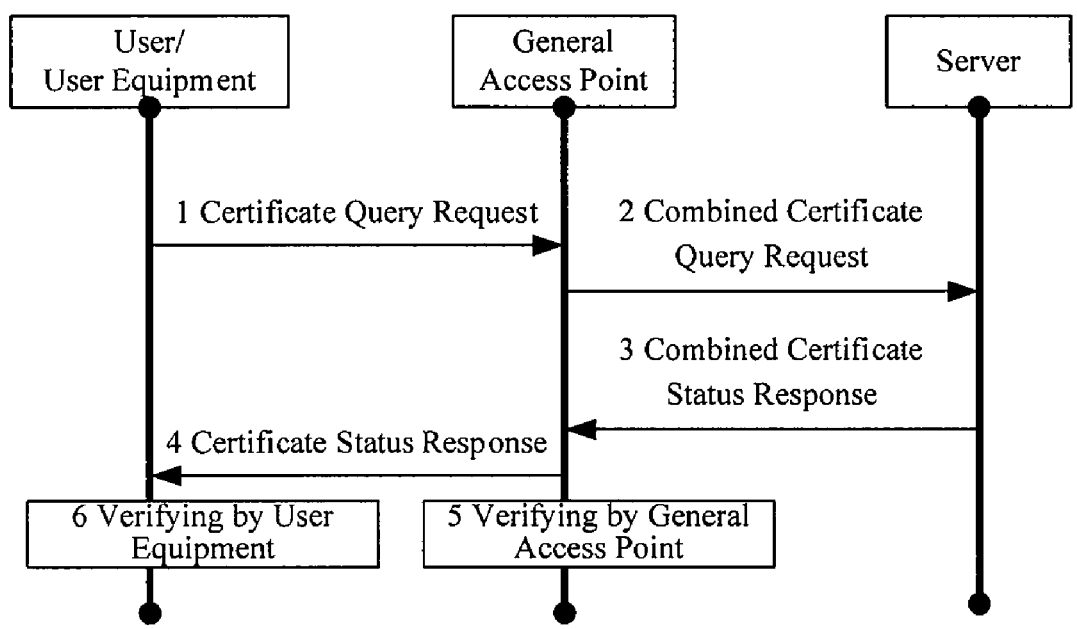

SYSTEMS, METHODS AND COMPUTER-ACCESSIBLE MEDIA FOR ACQUIRING AND AUTHENTICATING PUBLIC KEY CERTIFICATE STATUS

CROSS REFERENCE TO RELATED APPLICATION(S)

This application is a national phase application of International Application No. PCT/CN2007/070303 filed on Jul. 16, 2007 and published on Mar. 27, 2008 as International Publication No. WO 2008/034361 (the "International Application"). This application claims the priority from the International Application pursuant to 35 U.S.C. §120, and from Chinese Patent Application No. 200610104680.7 filed on Sep. 23, 2006, under 35 U.S.C. §119. The disclosures of the above-referenced applications are incorporated herein by reference in their entireties.

FIELD OF THE INVENTION

The present disclosure relates to public key management in network communications, and in particular to systems, methods and computer accessible media for obtaining and verifying a public key status in network communications.

BACKGROUND INFORMATION

When accessing an internet environment, user equipment likely needs a certain type of access service. Providers of such access service include a wire Digital Subscriber Line (DSL), a Cable system, a Wireless Local Area Network (WLAN) access and a Wireless Metropolitan Area Network (WiMAX) access, etc. Typically, a terminal of an access system is called a general access point. For example, the general access point may be a WLAN Access Point (AP), a WiMAX Base Station (BS), or an access device of a DSL system end office and the like.

When user equipment accesses the internet via the general access point, security problems may exist in the link between the user equipment and the general access point. For example, an intruder may obtain the key of a user using security vulnerabilities existing in the user end modem of the DSL system, or the intruder may pretend to be a general access point via wireless links to induce the user to enter some networks containing illegal contents which leads to the waste of time and energy of the user.

With respect to all kinds of attacks, access networks employ various security mechanisms. For example, the WLAN and the WiMAX both support the security mechanism based on public key infrastructure. Being compared with a security mechanism based on symmetric key, the security mechanism based on public key infrastructure can provide a non-repudiation function, thus avoiding some conflicts between the user and the access network service provider. For example, regarding a charged access service provided by the access network service provider to the user, if the security mechanism is only based on symmetric key, i.e. the key held by the user and that held by the access network service provider are identical, it is hard to determine whether the charged access service is open upon user authorization or is open by the service provider. However, if the security mechanism is based on public key infrastructure, the above problem can be solved using signature techniques.

The public key infrastructure refers to secure infrastructure having generalities which implements and provides security services using the concept and techniques of public key, and can provide security services such as verification, integrity, security and the like, and supports secure communication, secure timestamp, notarization, non-repudiation, and privilege management, etc. Public key certificate and certificate authority are two important concepts in the public key infrastructure. Specifically, the public key certificate refers to a group of data which is attached with a signature and contains a particular entity name and the public key of the entity. The public key certificate is typically issued by the certificate authority, and the signature in the public key certificate is provided by the certificate authority. By way of providing a signature, the certificate authority verifies the binding relationship between the holder of the public key certificate and the public key of the holder. The signature provided by the certificate authority is generated by the certificate authority using signature algorithms.

The public key certificate authenticated by the certificate authority often has a life time, and the certificate is invalid upon termination of the life time. If a private key corresponding to the public key certificate is leaked, the public key certificate should also be invalid. In addition, there are other conditions that may lead to the public key certificate to be invalid. For example, original information is invalid after a certain entity changes its job. In network communications, it is very important to obtain the status of the public key certificate, i.e. whether the public key certificate is still valid. Participant entities in the network communications always refuse to establish a secure communication with a participant entity holding invalid public key certificate.

Conventionally, the public key certificate status is often obtained using two types of approaches as follows:

First approach: the public key certificate status is obtained by downloading a Certificate Revocation List (CRL), including total certificate list downloading and incremental certificate list downloading. When it is required to verify the status of a certain public key certificate, a certain entity downloads a latest Certificate Revocation List, to thus check whether the public key certificate to be verified is in the latest Certificate Revocation List. The approach of incremental certificate list reduces the amount of the certificate to be downloaded each time, and the corresponding method for verifying a public key certificate is similar to that of total revocation list downloading. There are other approaches of such a comparing-after-downloading type, such as Certificate Revocation List distribution points, indirect Certificate Revocation List and the like.

Second approach: the public key certificate status is obtained by an online query mechanism, such as the Online Certificate Status Protocol (OCSP). The OCSP mainly relates to two entities, i.e. the client and the server, and is a typical client/server structure. The client sends a request to the server, and the server returns a response. A series of certificates required to be verified are contained in the request, and the verification interval and the status of the series of certificates are contained in the response. In addition to the OCSP, there is still another online query mechanism which is called the Simple Certification Validation Protocol (SCVP). The SCVP is a protocol having much more functions than the OCSP, including a certificate path discovery function and a certificate path construction function, as well as the functions of the OCSP. Generally speaking, the SCVP is still in a two-tuple structure of client/server.

To obtain the public key certificate status by the access network using the above approaches generally results in problems as follows:

First, the storage resources of the user equipment may has a limitation, or the user does not wish to store the Certificate Revocation List at all, thus leading to a difficulty in the implementation of periodically downloading Certificate Revocation List to the user equipment. Although there is often no resource limitation for the access network, a policy limitation may exist in the access network. Meanwhile, the approach of downloading the Certificate Revocation List also goes against a central management of Certificate Revocation Lists, and also brings an overhead to the network bandwidth. Particularly, when the user equipment is unable to store the Certificate Revocation List, the access network needs additional overheads to store and maintain the synchronization of the Certificate Revocation List.

Further, when using the online query mechanism, the user needs to execute separate protocols via a background server, such as the OCSP or the SCVP and the like, and the access network also needs to execute separate protocols such as the OCSP or the SCVP in corporation with the background network. These protocols often operate over the HTTP protocol, which is an application layer protocol. However, the certificate status verification often occurs at a time at which neither secure link nor connection between the user and the access network is established, so that direct use of these protocols is very complicated. Even applicable for use, it is also required to use the user equipment/server and the general access point/server architecture to accomplish implementation.

Thus, conventionally, a method for obtaining a public key certificate status applicable for the network architecture of user equipment, a general access point and a server is likely unavailable.

SUMMARY OF EXEMPLARY EMBODIMENTS

An exemplary embodiment of the present disclosure provides systems, methods and computer accessible media for obtaining and verifying a public key certificate status, and can solve a technical problem in the prior art of complicated implementation as well as inability to be applied to the network architecture of user equipment, a general access point and a server.

For example, according to one exemplary embodiment of the present disclosure, a method can be provided for obtaining and verifying a public key certificate status. Such exemplary method includes:

(1) constructing and sending a certificate query request which comprises:
  (1.1) constructing the certificate query request: generating, by user equipment, a random number U_Rand, and reading a user equipment certificate U_Cert stored locally, to construct the certificate query request:
  U_Cert||U_Rand,
  wherein the "||" refers to the user equipment certificate U_Cert being joined-up in series with the random number U_Rand generated by the user equipment, regardless of sequence.
  (1.2) sending the certificate query request: sending, by the user equipment, the certificate query request to a general access point using a network transmission approach;
(2) constructing and sending a combined certificate query request which comprises:
  (2.1) constructing the combined certificate query request: generating, by the general access point, a random number G_Rand, and reading a general access point equipment certificate G_Cert stored locally, to construct the combined certificate query request:
  U_Cert||U_Rand||G_Cert||G_Rand,
  (2.2) sending the combined certificate query request: sending, by the general access point, the combined certificate query request to a server using a network transmission approach;
(3) constructing and sending a combined certificate status response which comprises:
  (3.1) searching, by the server upon reception of the combined certificate query request, whether the user equipment certificate U_Cert and/or an identifier of the general access point equipment certificate G_Cert are/is contained in a local or a remote Certificate Revocation List;
  (3.2) constructing a user certificate status U_Result and a general access point certificate status G_Result;
  (3.3) constructing, by the server, a message m:
  m=U_ID||U_Result||G_Cert||G_Result||U_Rand||G_Rand,
  wherein the U_ID refers to a user equipment identifier in the user equipment certificate U_Cert;
  (3.4) finding, by the server, a user equipment trusted certificate authority U_CA and a general access point trusted certificate authority G_CA, and obtaining a signature $Sig_{U\_CA}(m)$ signed for the message m by the user equipment trusted certificate authority U_CA using its own private key as well as a signature $Sig_{G\_CA}(m)$ signed for the message m by the general access point trusted certificate authority G_CA using its own private key;
  (3.5) constructing, by the server, a combined certificate status response message:
  $m||Sig_{U\_CA}(m)||Sig_{G\_CA}(m)$
  (3.6) sending, by the server, the combined certificate status response message to the general access point using a network transmission approach;
(4) delivering a certificate status response which comprises:
  (4.1) constructing, by the general access point upon reception of the combined certificate status response message, a certificate status response message:
  $m||Sig_{U\_CA}(m)$
  (4.2) delivering, by the general access point, the certificate status response message to the user equipment;
(5) carrying out verification by the general access point which comprises:
  (5.1) determining, by the general access point, whether the signature $Sig_{G\_CA}(m)$ signed for the message m by the general access point trusted certificate authority G_CA using its own private key is valid:
    if the determination results in invalidity, the query fails, then carrying out error log recording and terminating operation; and
    if the determination results in validity, then
    carrying out comparison to determine whether the random number G_Rand generated by the general access point is consistent with a random number generated locally, and carrying out comparison to determine whether the general access point equipment certificate G_Cert stored locally by the general access point is consistent with a general access point equipment certificate stored locally:
    if one of the comparison results in inconsistence, then carrying out error log recording and terminating operation; and
    if the two comparison both result in consistence, then
    further carrying out comparison to determine whether the user equipment identifier U_ID in the user equipment certificate U_Cert is consistent with a user equipment identifier of the user equipment certificate U_Cert in a certificate status query request message of the certificate query request:
   if the further comparison results in inconsistence, then carrying out error log recording and terminating operation; and
   if the further comparison results in consistence, then checking the user certificate status U_Result, and if the user certificate status U_Result is error information, then carrying out error log recording and terminating operation; and if the user certificate status U_Result is correct information, then employing a 3-tuple to record locally, according to the user certificate status U_Result, a status of the user equipment certificate U_Cert as follows:
      <U_Cert, U_Result, Local Time>,
wherein the Local Time is local time of the general access point;
   (5.2) selecting, by the general access point, "to execute" or "not to execute" or "to periodically execute" local certificate status recording:
      if it is to execute or to periodically execute, then checking the general access point certificate status G_Result, and if the general access point certificate status G_Result is valid, then terminating operation; and if the general access point certificate status G_Result is invalid, then providing an error log according to the general access point certificate status G_Result and prompting that a local certificate status query error occurs.
(6) carrying out verification by the user equipment which comprises:
   (6.1) determining, by the user equipment, whether the signature $Sig_{U\_CA}(m)$ signed for the message m by the user equipment trusted certificate authority U_CA using its own private key is valid:
      if the determination results in invalidity, the query fails, then carrying out error log recording and terminating operation; and
      if the determination results in validity, then carrying out comparison to determine whether the random number U_Rand generated by the user equipment is consistent with a random number generated locally, and carrying out comparison to determine whether the user equipment identifier U_ID in the user equipment certificate U_Cert is consistent with a user equipment identifier of the user equipment certificate stored locally:
      if one of the two comparison results in inconsistence, then carrying out error log recording and terminating operation; and
      if the two comparison both result in consistence, then extracting identifier information G_ID of the general access point locally; and if the extraction of the G_ID successes, then carrying out comparison to determine whether a G_ID in the general access point equipment certificate G_Cert is consistent with the G_ID extracted locally:
      if the comparison results in inconsistence, then carrying out error log recording and terminating operation; and
      if the comparison results in consistence, then determining that a 3-tuple of the G_Cert has already been stored locally, and terminating operation; and
      if the extraction of the G_ID fails, then storing the general access point equipment certificate G_Cert, and executing following operations:
      checking the general access point certificate status G_Result, and if the general access point certificate status G_Result is error information, then carrying out error log recording and terminating operation; and
      if the general access point certificate status G_Result is correct information, then employing a 3-tuple to record locally, according to the general access point certificate status G_Result, a status of the general access point equipment certificate G_Cert as follows:
         <G_Cert, G_Result, Local Time>,
wherein the Local Time is local time of the user equipment;
   (6.2) selecting, by the user equipment, "to execute" or "not to execute" or "to periodically execute" local certificate status recording:
      if it is to execute or to periodically execute, then checking the user certificate status U_Result, and if the user certificate status U_Result is valid, then terminating operation; and if the user certificate status U_Result is invalid, then providing an error log according to the user certificate status U_Result and prompting an access user that a local certificate status query error occurs.

An exemplary network transmission approach can be a data link layer transmission approach, a network layer transmission approach, or other transmission approaches.

The exemplary network transmission approach for sending, by the general access point, the combined certificate query request to the server can be either identical to or different from the network transmission approach between the user equipment and the general access point.

The exemplary user equipment trusted certificate authority U_CA is either identical to or different from the general access point trusted certificate authority G_CA.

Contents of the user certificate status U_Result and the general access point status G_Result include issuance time of the queried Certificate Revocation List and a status of the queried certificate, and the status of the certificate includes valid, revoked, or error information.

According to an exemplary embodiment of the present disclosure, systems, methods and computer-accessible media can be provided for obtaining a user certificate status to provide certificate statuses of the user or the user equipment and the general access point when the user equipment accesses the network via the general access point. For example, message exchanges can be reduced, bandwidth and calculation resources can be saved, and higher efficiency can be achieved.

By way of adding random numbers into the certificate query request and the combined certificate query request as well as the message m, freshness of the certificate status response can be ensured, and security protection can be enhanced.

According to another exemplary embodiment of the present disclosure, systems, methods and computer-accessible media can be provided for obtaining a certificate status specifically with respect to the network architecture of user equipment, a general access point and a server, where the user equipment and the general access point can obtain the certificate statuses of the opposite party and of its own, and can also verify that the obtained certificate statuses are issued by trusted authority organizations.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the present disclosure will become apparent from the following detailed description taken in conjunction with the accompanying figure(s) showing illustrative embodiment(s), result(s) and/or feature(s) of the exemplary embodiment(s) of the present invention, in which:

FIG. 1 is a diagram illustrating implementation procedures according to an exemplary embodiment of the present disclosure.

In the following, with reference to the drawings of the embodiments of the present invention, the technical solution of the present invention is described in detail. The described embodiments represent a part of the embodiments of the invention, instead of all of the embodiments. Based on the embodiments of the present disclosure, all other embodiments devised by those ordinarily skilled in the art without involving an inventive step fall within the scope of the invention.

DETAILED DESCRIPTION OF EXEMPLARY EMBODIMENTS

Before the exemplary embodiments of the procedures according to the present disclosure are performed, the participant entities, including the user equipment, the general access point and the server, have all been assigned with a public key certificate. The server can provide the user equipment and the general access point with signatures signed by respective trusted certificate authorities. When the exemplary procedure(s) of the present disclosure is/are carried out, the user equipment and the general access point can obtain the certificate of the opposite party, and verify the certificate statuses of the opposite party and of their own. Via the server, the user equipment and the general access point can obtain the public key certificates and the public key certificate statuses of their own and the opposite party. In the present disclosure, the following can be used:

m can refer to a message;

U_CA can refer to a user equipment trusted certificate authority;

U_Cert can refer to a user equipment certificate stored locally by user equipment;

U_CA_Cert can refer to a certificate of the user equipment trusted certificate authority stored locally by the user equipment;

G_CA can refer to a general access point trusted certificate authority, and the user equipment trusted certificate authority U_CA and the general access point trusted certificate authority G_CA may be identical to or different from each other;

G_Cert can refer to a general access point equipment certificate stored locally by a general access point;

G_CA_Cert can refer to a certificate of the general access point trusted certificate authority stored locally by the general access point;

SigU_CA(m) can refer to a signature signed for the message m by the user equipment trusted certificate authority U_CA using its own private key and using a certain type of signature algorithm;

SigG_CA(m) can refer to a signature signed for the message m by the general access point trusted certificate authority G_CA using private key of its own and using a certain type of signature algorithm;

U_Rand can refer to a one-time random number generated by the user equipment;

G_Rand can refer to a one-time random number generated by the general access point;

U_Result can refer to a user certificate status;

G_Result can refer to a general access point certificate status;

U_ID can refer to a user equipment identifier in the user equipment certificate U_Cert;

G_ID can refer to a general access point identifier in the general access point equipment certificate G_Cert;

The exemplary signature algorithms or procedures of the present disclosure can meet the security requirements or preferences with respect to adaptive chosen message attack.

Referring to FIG. 1, the exemplary implementation procedures according to the present disclosure can be as follows:

(1) constructing and sending a certificate query request which can comprise:
  (1.1) constructing the certificate query request: generating, by user equipment, a random number U_Rand, and reading a user equipment certificate U_Cert stored locally, to construct the certificate query request:
    U_Cert||U_Rand,
  wherein the "||" can refer to the user equipment certificate U_Cert being joined-up in series with the random number U_Rand generated by the user equipment, regardless of sequence.
  (1.2) sending the certificate query request: sending, by the user equipment, the certificate query request to a general access point using a network transmission approach. The network transmission approach may be a data link layer transmission approach, a network layer transmission approach, or other transmission approaches.

(2) constructing and sending a combined certificate query request which can comprise:
  (2.1) constructing the combined certificate query request: generating, by the general access point, a random number G_Rand, and reading a general access point equipment certificate G_Cert stored locally, to construct the combined certificate query request:
    U_Cert||U_Rand||G_Cert||G_Rand;
  (2.2) sending the combined certificate query request: sending, by the general access point, the combined certificate query request to a server using a network transmission approach. The network transmission approach for sending, by the general access point, the combined certificate query request to the server is either identical to or different from the network transmission approach between the user equipment and the general access point.

(3) constructing and sending a combined certificate status response which can comprise:
  (3.1) searching, by the server upon reception of the combined certificate query request, whether the user equipment certificate U_Cert and/or an identifier of the general access point equipment certificate G_Cert are/is contained in a local or a remote Certificate Revocation List.
  (3.2) constructing a user certificate status U_Result and a general access point certificate status G_Result. Contents of the user certificate status U_Result and the general access point status G_Result include issuance time of the queried Certificate Revocation List and a status of the queried certificate, and the status of the certificate includes valid, revoked, or error information.
  (3.3) constructing, by the server, a message m:
    m=U_ID||U_Result||G_Cert||G_Result||U_Rand||G_Rand,
  wherein the U_ID refers to a user equipment identifier in the user equipment certificate U_Cert;
  (3.4) finding, by the server, a user equipment trusted certificate authority U_CA and a general access point trusted certificate authority G_CA, and obtaining a signature SigU_CA(m) signed for the message m by the user equipment trusted certificate authority U_CA using its own private key as well as a signature SigG_CA(m) signed for the message m by the general access point trusted certificate authority G_CA using its own private key;

(3.5) constructing, by the server, a combined certificate status response message:

m||SigU_CA(m)||SigG_CA(m).

(3.6) sending, by the server, the combined certificate status response message to the general access point using a network transmission approach.

(4) delivering a certificate status response which can comprise:

(4.1) constructing, by the general access point upon reception of the combined certificate status response message, a certificate status response message:

m||SigU_CA(m).

(4.2) delivering, by the general access point, the certificate status response message to the user equipment.

(5) carrying out verification by the general access point:

(5.1) determining, by the general access point, whether the signature SigG_CA(m) signed for the message m by the general access point trusted certificate authority G_CA using its own private key is valid:

if the determination results in invalidity, the query fails, then carrying out error log recording and terminating operation; and if the determination results in validity, then carrying out comparison to determine whether the random number G_Rand generated by the general access point is consistent with a random number generated locally, and carrying out comparison to determine whether the general access point equipment certificate G_Cert stored locally by the general access point is consistent with a general access point equipment certificate stored locally:

if one of the comparison results in inconsistence, then carrying out error log recording and terminating operation; and if the two comparison both result in consistence, then further carrying out comparison to determine whether the user equipment identifier U_ID in the user equipment certificate U_Cert is consistent with a user equipment identifier of the user equipment certificate U_Cert in a certificate status query request message of the certificate query request:

if the further comparison results in inconsistence, then carrying out error log recording and terminating operation; and if the further comparison results in consistence, then checking the user certificate status U_Result, and if the user certificate status U_Result is error information, then carrying out error log recording and terminating operation; and if the user certificate status U_Result is correct information, then employing a 3-tuple to record locally, according to the user certificate status U_Result, a status of the user equipment certificate U_Cert as follows:

<U_Cert, U_Result, Local Time>, wherein the Local Time is local time of the general access point;

(5.2) selecting, by the general access point, "to execute" or "not to execute" or "to periodically execute" local certificate status recording:

if it is to execute or to periodically execute, then checking the general access point certificate status G_Result, and if the general access point certificate status G_Result is valid, then terminating operation; and if the general access point certificate status G_Result is invalid, then providing an error log according to the general access point certificate status G_Result and prompting that a local certificate status query error occurs.

(6) carrying out verification by the user equipment which can comprise:

(6.1) determining, by the user equipment, whether the signature SigU_CA(m) signed for the message m by the user equipment trusted certificate authority U_CA using its own private key is valid:

if the determination results in invalidity, the query fails, then carrying out error log recording and terminating operation; and if the determination results in validity, then carrying out comparison to determine whether the random number U_Rand generated by the user equipment is consistent with a random number generated locally, and carrying out comparison to determine whether the user equipment identifier U_ID in the user equipment certificate U_Cert is consistent with a user equipment identifier of the user equipment certificate stored locally:

if one of the two comparison results in inconsistence, then carrying out error log recording and terminating operation; and if the two comparison both result in consistence, then extracting identifier information G_ID of the general access point locally; and if the extraction of the G_ID successes, then carrying out comparison to determine whether a G_ID in the general access point equipment certificate G_Cert is consistent with the G_ID extracted locally:

if the comparison results in inconsistence, then carrying out error log recording and terminating operation; and if the comparison results in consistence, then determining that a 3-tuple of the G_Cert has already been stored locally, and terminating operation; and if the extraction of the G_ID fails, then storing the general access point equipment certificate G_Cert, and executing following operations:

checking the general access point certificate status G_Result, and if the general access point certificate status G_Result is error information, then carrying out error log recording and terminating operation; and if the general access point certificate status G_Result is correct information, then employing a 3-tuple to record locally, according to the general access point certificate status G_Result, a status of the general access point equipment certificate G_Cert as follows:

<G_Cert, G_Result, Local Time>, wherein the Local Time is local time of the user equipment.

(6.2) selecting, by the user equipment, "to execute" or "not to execute" or "to periodically execute" local certificate status recording:

if it is to execute or to periodically execute, then checking the user certificate status U_Result, and if the user certificate status U_Result is valid, then terminating operation; and if the user certificate status U_Result is invalid, then providing an error log according to the user certificate status U_Result and prompting an access user that a local certificate status query error occurs.

As provided herein below, the exemplary implementation of the exemplary procedure(s) according to the present disclosure is further described with reference to exemplary embodiments.

A. Exemplary Embodiment 1

It can be assumed that the user equipment is a notebook or another computing device, the general access point can be a WiMAX base station, and the server can refer to a certificate authority. The certificate authority can issue certificates to the user and the WiMAX base station. The user equipment certificate U_Cert and the certificate authority certificate U_CA_Cert can be stored in the notebook or in another computing device. The general access point certificate G_Cert and the certificate authority certificate G_CA_Cert can be stored in the WiMAX base station. The certificate authority can have a local Certificate Revocation List, including the Certificate Revocation Lists of the user or the user equipment and the base station.

The user equipment can send a certificate query request, and upon reception of the request, the WiMAX base station can send a combined certificate query request, and the server constructs a combined certificate status response message. For the reason that the user and the base station can have a certificate authority identical to each other, the server, e.g., only needs to query the statuses of the user and the base station certificate from the local Certificate Revocation List, and can construct the message m. Based on the same or similar reason, the server, e.g., only needs to sign once to accomplish the construction of the combined certificate status response message. Then, the base station can deliver the combined certificate status response message to the user equipment as a certificate status response message, and then can perform the verification by the general access point. Upon reception of the certificate status response message, the user equipment can perform the verification by the user equipment.

B. Exemplary Embodiment 2

It can be assumed that the user equipment is a notebook or another computing device, the general access point is a WiMAX base station, and authenticated communication channels can exist between the server and the user equipment trusted certificate authority U_CA as well as the general access point trusted certificate authority G_CA. The general access point trusted certificate authority G_CA can issue a certificate to the WiMAX base station, and the user equipment trusted certificate authority U_CA can issue a certificate to the user or the user equipment. The user equipment certificate U_Cert and the certificate authority certificate U_CA_Cert can be stored in the notebook or in another computing device. The general access point certificate G_Cert and the certificate authority certificate G_CA_Cert can be stored in the WiMAX base station. The user equipment trusted certificate authority U_CA and the general access point trusted certificate authority G_CA can have local Certificate Revocation Lists respectively, which respectively can include Certificate Revocation Lists of the user/user equipment and of the base station.

The user equipment sends a certificate query request, and upon reception of the request, the WiMAX base station can send a combined certificate query request, and via the authenticated channels, the server determines the certificate status of the user/user equipment and the general access point from the local Certificate Revocation Lists of the user equipment trusted certificate authority U_CA and the general access point trusted certificate authority G_CA, and can construct the message m. Then, via the authenticated channels, the server obtains the signatures signed for the message m by the user equipment trusted certificate authority U_CA and the general access point trusted certificate authority G_CA, and can construct a combined certificate status response. Then, the base station can send the message m in the combined certificate status response message and the signature of the user equipment trusted certificate authority U_CA to the user equipment as a certificate status response message, and then can perform the verification by the general access point. Upon reception of the certificate status response message, the user equipment can perform the verification by the user equipment.

C. Exemplary Embodiment 3

It can be assumed that the user equipment is a notebook or another computing device, the general access point is a WLAN Access Point (AP), and the server is a WLAN authentication server. The authentication server issues certificates to the user and the AP. The user equipment certificate U_Cert and the authentication server certificate U_CA_Cert can be stored in the notebook or in another computing device. The general access point equipment certificate G_Cert and the authentication server certificate G_CA_Cert can be stored in the WLAN Access Point. The authentication server can have a local Certificate Revocation List, including the Certificate Revocation Lists of the user equipment and the base station.

The user equipment sends a certificate query request, and upon reception of the request, the WLAN Access Point can send a combined certificate query request, and the authentication server can construct a combined certificate status response message. The authentication server, e.g., only needs to query the statuses of the user and the base station certificate from the local Certificate Revocation List, can construct the message m, and signs, to accomplish the construction of the combined certificate status response message. Then, the AP can deliver the combined certificate status response message to the user equipment as a certificate status response message, and can then perform the verification by the general access point. Upon reception of the certificate status response message, the user equipment can perform the verification by the user equipment.

The exemplary embodiments of the present disclosure can have the following exemplary advantages:

The exemplary embodiments of the present disclosure can utilize the exemplary procedure for obtaining a user certificate status to provide certificate statuses of the user or the user equipment and the general access point when the user equipment accesses the network via the general access point. Message exchanges can be reduced, bandwidth and calculation resources can be saved, and higher efficiency can be achieved.

By way of adding random numbers into the certificate query request and the combined certificate query request as well as the message m, freshness of the certificate status response can be ensured, and security protection can be enhanced.

The exemplary embodiments of the present disclosure can provide a method for obtaining a certificate status specifically with respect to the network architecture of user equipment, a general access point and a server, where the user equipment and the general access point can obtain the certificate statuses of the opposite party and of its own, and can also verify that the obtained certificate statuses are issued by trusted authority organizations.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements, media and methods which, although not explicitly shown or described herein, embody the principles of the invention and are thus within the spirit and scope of the present invention. In addition, all publications referenced herein above are incorporated herein by reference in their entireties.

What is claimed is:

1. A method for obtaining and verifying a public key certificate status, comprising:
    a) generating and transmitting a certificate query request by:
        generating, using a user equipment, a random number (U_Rand), and obtaining a user equipment certificate (U_Cert) stored locally, to generate the certificate query request as follows:

U_Cert||U_Rand, wherein the "||" refers to joining-up in series regardless of sequence, and
        transmitting, by the user equipment, the certificate query request to a general access point using a network transmission manner;
    b) generating and transmitting a combined certificate query request by:
        generating, by the general access point, a random number (G_Rand), and obtaining a general access point equipment certificate (G_Cert) stored locally, to generate the combined certificate query request as follows:

U_Cert||U_Rand||G_Cert||G_Rand, and transmitting, by the general access point, the combined certificate query request to a server using the network transmission manner;
    c) generating and transmitting a combined certificate status response by:
        searching, by the server upon reception of the combined certificate query request, whether the user equipment certificate and the general access point equipment certificate are contained in at least one of a local Certificate Revocation List or a remote Certificate Revocation List,
        generating a user certificate status (U_Result) and a general access point certificate status (G_Result),
        generating, by the server, a message m,
        wherein:

m=U_ID||U_Result||G_Cert||G_Result||U_Rand||G_Rand, and wherein the U_ID refers to a user equipment identifier in the user equipment certificate,
        determining, by the server, a user equipment trusted certificate authority (U_CA) and a general access point trusted certificate authority (G_CA), and obtaining a first signature ($Sig_{U\_CA}(m)$) signed for the message m by the user equipment trusted certificate authority using a first private key thereof and a second signature ($Sig_{G\_CA}(m)$) signed for the message m by the general access point trusted certificate authority using a second private key thereof,
        generating, by the server, a combined certificate status response message as follows:

m||$Sig_{U\_CA}(m)$||$Sig_{G\_CA}(m)$, and transmitting, by the server, the combined certificate status response message to the general access point using the network transmission manner;
    d) providing a certificate status response by:
        generating, by the general access point upon reception of the combined certificate status response message, a certificate status response message as follows:

m||$Sig_{U\_CA}(m)$, and providing, by the general access point, the certificate status response message to the user equipment;
    e) performing a verification by the general access point by:
        if it is determined, by the general access point, that the second signature is valid, performing a first comparison to determine whether the random number generated by the general access point is consistent with a locally-generated random number, and performing a second comparison to determine whether the general access point equipment certificate stored locally by the general access point is consistent with a locally-stored general access point equipment certificate,
        if the first and second comparisons both result in consistence, then further performing a third comparison to determine whether the user equipment identifier in the user equipment certificate is consistent with a user equipment identifier of the user equipment certificate in a certificate status query request message of the certificate query request,
        if the third comparison results in consistence, determining whether the user certificate status is correct information, and if so, then utilizing a 3-tuple to locally record, according to the user certificate status a status of the user equipment certificate as follows:

<U_Cert, U_Result, Local Time>, wherein the Local Time is local time of the general access point;
        selecting, by the general access point, "to execute" or "not to execute" or "to periodically execute" local certificate status recording, and if "to execute" or "to periodically execute" is selected, then checking the general access point certificate status, and
            i. if the general access point certificate status is valid, then terminating operation; and
            ii. if the general access point certificate status is invalid, then providing an error log according to the general access point certificate status and prompting that a local certificate status query error occurred.

2. The method according to claim 1, wherein the performance of the verification by the general access point further comprises performing error log recording and terminating operation if at least one of following conditions is met:
    it is determined, by the general access point, that the second signature is invalid;
    one of the first or second comparison results in inconsistence;
    the third comparison results in inconsistence; or
    the determination of the user certificate status results in that the user certificate status is error information.

3. The method according to claim 1, further comprising:

f) performing a verification by the user equipment by:

if it is determined, by the user equipment, that the first signature is valid, then performing a fourth comparison to determine whether the random number generated by the user equipment is consistent with locally-generated random number, and performing a fifth comparison to determine whether the user equipment identifier in the user equipment certificate is consistent with a locally-stored user equipment identifier of the user equipment certificate, if the fourth and fifth comparisons both result in consistence, then extracting identifier information (G_ID) of the general access point locally; and if the extraction of the identifier information of the general access point succeeds, then performing a sixth comparison to determine whether the identifier information in the general access point equipment certificate is consistent with the locally-extracted equipment certificate, if the sixth comparison results in consistence, then determining that a 3-tuple of the general access point equipment certificate has already been stored locally, and terminating operation, and if the extraction of the identifier information of the general access point fails, then storing the general access point equipment certificate, and performing following operations:

determining whether the general access point certificate status is correct information, and if so, then utilizing a 3-tuple to locally record, according to the general access point certificate status, a status of the general access point equipment certificate as follows:

<G_Cert, G_Result, Local Time>, wherein the Local Time is local time of the user equipment;

selecting, by the user equipment, "to execute" or "not to execute" or "to periodically execute" local certificate status recording, and if "to execute" or "to periodically execute" is selected, then checking the user certificate status, and i. if the user certificate status is valid, then terminating operation; and ii. if the user certificate status is invalid, then providing an error log according to the user certificate status and prompting an access user that a local certificate status query error occurred.

4. The method according to claim 3, wherein the performance of the verification by the user equipment further comprises performing error log recording and terminating operation if at least one of following conditions is met:

it is determined, by the user equipment, that the first signature is invalid;

one of the fourth or fifth comparison results in inconsistence;

the sixth comparison results in inconsistence; or the determination of the general access point certificate status results in that the general access point certificate status is error information.

5. The method according to claim 3, wherein the network transmission manner is at least one of a data link layer transmission manner or a network layer transmission manner.

6. The method according to claim 1, wherein the network transmission manner for transmitting, by the general access point, the combined certificate query request to the server is at least one of identical to or different from the network transmission manner between the user equipment and the general access point.

7. The method for according to claim 2, wherein the network transmission manner for transmitting, by the general access point, the combined certificate query request to the server is at least one of identical to or different from the network transmission manner between the user equipment and the general access point.

8. The method according to claim 3, wherein the network transmission manner for transmitting, by the general access point, the combined certificate query request to the server is at least one identical to or different from the network transmission manner between the user equipment and the general access point.

9. The method according to claim 4, wherein the network transmission manner for transmitting, by the general access point, the combined certificate query request to the server is at least one identical to or different from the network transmission manner between the user equipment and the general access point.

10. The method according to claim 5, wherein the network transmission manner for transmitting, by the general access point, the combined certificate query request to the server is at least one identical to or different from the network transmission manner between the user equipment and the general access point.

11. The method according to claim 6, wherein the user equipment trusted certificate authority is at least one identical to or different from the general access point trusted certificate authority.

12. The method according to claim 7, wherein the user equipment trusted certificate authority is at least one identical to or different from the general access point trusted certificate authority.

13. The method according to claim 8, wherein the user equipment trusted certificate authority is at least one identical to or different from the general access point trusted certificate authority.

14. The method according to claim 9, wherein the user equipment trusted certificate authority is at least one identical to or different from the general access point trusted certificate authority.

15. The method according to claim 10, wherein the user equipment trusted certificate authority is at least one identical to or different from the general access point trusted certificate authority.

16. The method according to claim 11, wherein contents of the user certificate status and the general access point status comprise issuance time of the queried Certificate Revocation List and a status of the queried certificate, and the status of the certificate comprises valid information, revoked information or error information.

17. The method according to claim 12, wherein contents of the user certificate status and the general access point status comprise issuance time of the queried Certificate Revocation List and a status of the queried certificate, and the status of the certificate comprises valid information, revoked information or error information.

18. The method according to claim 13, wherein contents of the user certificate status and the general access point status comprise issuance time of the queried Certificate Revocation List and a status of the queried certificate, and the status of the certificate comprises valid information, revoked information or error information.

19. The method according to claim 14, wherein contents of the user certificate status and the general access point status comprise issuance time of the queried Certificate Revocation List and a status of the queried certificate, and the status of the certificate comprises valid information, revoked information or error information.

20. The method according to claim 15, wherein contents of the user certificate status and the general access point status comprise issuance time of the queried Certificate Revocation List and a status of the queried certificate, and the status of the certificate comprises valid information, revoked information or error information.

* * * * *